(12) United States Patent
Jen et al.

(10) Patent No.: US 10,385,777 B2
(45) Date of Patent: Aug. 20, 2019

(54) BIFURCATED INLET SCOOP FOR GAS TURBINE ENGINE

(71) Applicant: UNITED TECHNOLOGIES CORPORATION, Farmington, CT (US)

(72) Inventors: Hsianmin Jen, Woodbridge, CT (US); Sergey Losyev, Waterbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 874 days.

(21) Appl. No.: 13/926,632

(22) Filed: Jun. 25, 2013

(65) Prior Publication Data

US 2014/0248119 A1    Sep. 4, 2014

Related U.S. Application Data

(60) Provisional application No. 61/708,557, filed on Oct. 1, 2012.

(51) Int. Cl.
*F02C 7/04*    (2006.01)
*F01D 9/02*    (2006.01)
(Continued)

(52) U.S. Cl.
CPC .................. *F02C 7/04* (2013.01); *F01D 9/02* (2013.01); *F01D 9/065* (2013.01); *F02C 6/08* (2013.01);
(Continued)

(58) Field of Classification Search
CPC .. F02C 7/04; F02C 7/045; F02C 7/047; F02C 7/057; F02C 6/04; F01D 9/02; F01D 9/023; F01D 25/02; F01D 25/14; F05D 2240/121; F05D 2240/126; F05D 2250/51; F05D 2260/205; F05D 2260/606
(Continued)

(56) References Cited

U.S. PATENT DOCUMENTS

| 2,721,715 | A | * | 10/1955 | Hoadley | .................. F02C 7/04 137/15.1 |
| 2,772,620 | A | | 12/1956 | Ferri | |

(Continued)

FOREIGN PATENT DOCUMENTS

EP    1882824 A2    1/2008

OTHER PUBLICATIONS

International Search Report and Written Opinion for related International Application No. PCT/US2013/051336; report dated Apr. 21, 2014.
(Continued)

*Primary Examiner* — Ninh H. Nguyen
*Assistant Examiner* — Wayne A Lambert
(74) *Attorney, Agent, or Firm* — Cantor Colburn LLP (57) ABSTRACT

A bifurcated inlet scoop frame for a gas turbine engine and method of using such frame for a gas turbine engine are disclosed. The bifurcated inlet scoop frame having a nose, a first side panel, and a second side panel. The first side panel and the nose defining a first inlet port. The second side panel and the nose defining a second inlet port. The method including the steps of providing a bifurcated inlet scoop frame, splitting the fan air flow, and receiving fan air through the bifurcated inlet scoop frame.

15 Claims, 6 Drawing Sheets

(51) Int. Cl.
  *F01D 9/06* (2006.01)
  *F02C 6/08* (2006.01)
  *F02C 7/14* (2006.01)
  *B64D 13/06* (2006.01)

(52) U.S. Cl.
  CPC ........ *F02C 7/14* (2013.01); *B64D 2013/0603* (2013.01); *F05D 2220/36* (2013.01); *F05D 2250/51* (2013.01); *Y02T 50/675* (2013.01)

(58) Field of Classification Search
  USPC .......................................................... 415/144
  See application file for complete search history.

(56) References Cited

U.S. PATENT DOCUMENTS

| | | | | |
|---|---|---|---|---|
| 2,906,089 A * | 9/1959 | Bertin | ........................ | F02K 7/02 137/15.1 |
| 3,095,166 A * | 6/1963 | Brigge, Jr. | ............. | B64D 33/04 239/265.41 |
| 3,486,435 A * | 12/1969 | Holt | ........................ | B64D 13/02 454/71 |
| 3,966,355 A * | 6/1976 | Pierpoline | ................ | F01D 25/32 415/144 |
| 3,981,466 A * | 9/1976 | Shah | ........................ | B64D 15/02 165/42 |
| 4,004,416 A * | 1/1977 | Amelio | .................... | F02K 1/825 239/127.3 |
| 4,174,083 A * | 11/1979 | Mohn | .................... | B64D 33/02 137/15.1 |
| 4,187,675 A | 2/1980 | Wakeman | | |
| 4,254,618 A * | 3/1981 | Elovic | .................... | F02C 7/185 60/226.1 |
| 4,643,636 A * | 2/1987 | Libertini | ................ | F01D 5/284 415/138 |
| 4,645,415 A * | 2/1987 | Hovan | .................. | F01D 25/125 415/115 |
| 4,782,658 A * | 11/1988 | Perry | ..................... | F02C 7/047 60/226.1 |
| 5,123,242 A * | 6/1992 | Miller | ........................ | F02C 7/14 165/300 |
| 5,203,163 A * | 4/1993 | Parsons | ..................... | F02C 6/08 60/226.1 |
| 5,239,816 A * | 8/1993 | Holt, III | .................... | F01D 9/02 60/39.53 |
| 5,490,644 A * | 2/1996 | Koncsek | ............... | B64C 21/025 137/15.1 |
| 5,729,969 A * | 3/1998 | Porte | ........................ | F02C 6/08 60/226.1 |
| 5,782,077 A * | 7/1998 | Porte | ........................ | F02C 7/185 165/154 |
| 6,050,527 A * | 4/2000 | Hebert | .................... | B64C 23/00 137/15.1 |
| 6,272,865 B1 * | 8/2001 | Clark | ........................ | F23R 3/14 60/748 |
| 7,344,107 B2 * | 3/2008 | Campbell | ............... | B64D 41/00 244/53 B |
| 7,455,498 B2 * | 11/2008 | Zysman | ................ | F01D 17/105 415/144 |
| 7,607,308 B2 * | 10/2009 | Kraft | ........................ | F02C 6/08 60/226.1 |
| 7,810,312 B2 * | 10/2010 | Stretton | ................... | F02C 7/141 60/226.1 |
| 2003/0051536 A1 * | 3/2003 | Tyll | ........................ | F02C 7/04 73/112.01 |
| 2005/0229605 A1 * | 10/2005 | Bouchard | ................. | F02C 7/04 60/793 |
| 2006/0071126 A1 | 4/2006 | Means | | |
| 2006/0223429 A1 * | 10/2006 | Groom | .................... | B64D 33/02 454/155 |
| 2008/0016845 A1 | 1/2008 | Zysman et al. | | |
| 2008/0080967 A1 | 4/2008 | Urbassik et al. | | |
| 2008/0230651 A1 | 9/2008 | Porte | | |
| 2009/0007528 A1 | 1/2009 | Wilson | | |
| 2010/0126182 A1 | 5/2010 | Hoover et al. | | |
| 2010/0300066 A1 * | 12/2010 | Bulin | ..................... | F01D 9/065 60/267 |
| 2011/0265650 A1 | 11/2011 | Kazlauskas et al. | | |
| 2013/0291554 A1 * | 11/2013 | Marini | ...................... | F02C 6/08 60/785 |

OTHER PUBLICATIONS

European Search Report for Application No. 13843231.5-1607—dated May 23, 2016; 7 pgs.
EP OA Issued for Application No. 13 843 231.5; dated Feb. 26, 2019.

* cited by examiner

BIFURCATED INLET SCOOP FOR GAS TURBINE ENGINE

CROSS REFERENCE TO RELATED APPLICATIONS

This application is a non-provisional application claiming the benefit of U.S. Provisional Patent Application No. 61/708,557 filed on Oct. 1, 2012.

TECHNICAL FIELD

This disclosure relates to inlets configured to intake air exiting a fan of a gas turbine engine, and more particularly to a scoop frame structure including such an inlet.

BACKGROUND

For aircraft utilizing gas turbine engines, such as turbofan engines and the like, air exiting a fan of the engine may flow from the fan into the compressor of the engine. That air is then compressed and directed to a combustor of the engine where it is combined with fuel and ignited. The product of that combustion is then directed to a turbine section of the engine to cause rotation of same. As the turbine section is mounted on the same shaft or shafts as the compressor and fan, all rotate and the process is continued.

However, some of such air exiting the fan may bypass or go around the compressor. For the purposes of the discussion herein, this fan flow stream that bypasses the engine will be referred to as "bypass air." Moreover, the percentage of air bypassing the compressor relative to the percentage of air entering the compressor is referred to as the "bypass ratio."

In addition, a portion of this fan air may be captured by an inlet port in a scoop frame generally disposed on the nacelle of the engine and may flow from the inlet of the scoop through one or more ducts or valves to apparatus such as a precooler, heat exchanger, or the like for further use. For example, the captured fan air may be used by the Environmental Control Air Conditioning System (ECS) for cooling of bleed air from the engine for circulation in the aircraft cabin. It may also be used by the Wing Anti-icing System (WAIS) for de-icing of the aircraft wings. Other uses may include cooling of engine oil, fuel, or the like by a heat exchanger located downstream of the scoop frame capturing the extracted fan air.

The fan air ideally flows around a nacelle upper bifurcation in a smooth, streamlined manner to yield low pressure loss in the fan duct stream. The inlet scoop frame may be located at the leading edge of the nacelle upper bifurcation in an attempt to capture the fan air with the highest possible fan air pressure. The inlet scoop frame typically has a single frontal opening generally sized to intake fan air at the maximum fan flow extraction condition, while still allowing a smooth, streamlined fan air flow around the nacelle upper bifurcation. This maximum fan flow extraction condition, typically considered the design point for the inlet scoop, is often associated with aircraft icing conditions at a specific aircraft holding altitude, flight speed and engine power setting.

On the other hand, the aircraft flight at non-icing conditions, and other flight altitudes, flight speeds and engine power settings such as take-off, idle, and climb, are normally considered as off-design points requiring less fan air extraction. Such off-design points may require fan air extraction that is not only less than that at the design point but that may also range down to near zero flow rate at the aircraft takeoff phase. At these off-design points, when the intake of the fan air into the inlet port of the scoop frame is relatively low, flow separation and spillage at the inlet scoop may occur and may result in high turbulence to the fan air stream. Consequently pressure loss to the fan stream at the nacelle nozzle exit may result.

In light of the above, it can be seen that nacelle fan air stream performance penalties may occur under various fan air flow extraction rates because of the flow separation and disturbances to the fan air flow stream. Nacelle fan airstream performance penalties are equivalent to increases in the aircraft fuel burn at cruise and a decrease in the available aircraft takeoff thrust. A better design is therefore needed for the scoop frame to minimize flow separation and spillage at off-design points.

SUMMARY OF THE DISCLOSURE

In accordance with one aspect of the present disclosure, a bifurcated inlet scoop frame for a gas turbine engine is disclosed. The bifurcated inlet scoop frame includes a nose, a first side panel, and a second side panel. The first side panel and the nose may define a first inlet port. The second side panel and the nose may define a second inlet port.

In a refinement, the first inlet port may have a throat width sized to a fan air flow extraction from a fan air stream at an aircraft design point.

In a further refinement, the first inlet port may have a throat width sized to capture about half of the maximum amount of fan air flow rate required to cool a first amount of engine bleed air to be used for air circulation within a cabin of an aircraft and a second amount of engine bleed air to be used for de-icing a portion of the aircraft.

In another refinement, the nose may be generally tear-shaped.

In yet another refinement, the height of the inlet port may be configured to capture the maximum fan air flow extraction from a main fan stream with an above-average total pressure distribution across a fan flow channel span.

In another refinement, the first side panel may have a sloped skirt.

In another aspect, a bifurcated inlet scoop system for a gas turbine engine is disclosed. The system may comprise a gas turbine engine, and a bifurcated inlet scoop frame proximate the gas turbine engine. The bifurcated inlet scoop frame may include a nose, a first side panel, and a second side panel. The first side panel and the nose may define a first inlet port. The second side panel and the nose may define a second inlet port. The first and second side panels may taper outward from the nose.

In a refinement, the first inlet port may have a first throat width sized to a fan air flow extraction from a fan air stream at an aircraft design point.

In a further refinement, the first throat width may be also sized to capture about half of the maximum amount of fan air flow rate required to cool a first amount of engine bleed air to be used for air circulation within a cabin of an aircraft and a second amount of engine bleed air to be used for de-icing a portion of the aircraft.

In a further refinement, the second inlet port may have a second throat width sized to a fan air flow extraction from a fan air stream at an aircraft design point.

In yet a further refinement, the second throat width may be also sized to capture about half of the maximum amount of fan air flow required to cool the first amount of engine bleed air to be used for air cabin circulation and the second amount of engine bleed air to be used for de-icing the portion of the aircraft.

In another refinement, the nose may be generally tear-shaped.

In another refinement, the height of the inlet port may be configured to capture the maximum fan air flow extraction from a main fan stream with an above-average total pressure distribution across a fan flow channel span.

In another refinement, the first side panel may have a sloped skirt.

In another refinement, the first inlet port may have a sloped inlet portion.

A method is also disclosed for bifurcating air received from a fan of a gas turbine engine. The method may comprise providing a bifurcated inlet scoop frame proximate the gas turbine engine, splitting the fan air flow, and receiving aircraft fan air through the bifurcated inlet scoop frame. The bifurcated inlet scoop frame may include a nose, a first side panel, and a second side panel. The first side panel and the nose may define a first inlet port. The second side panel and the nose may define a second inlet port. The first and second side panels may taper outward from the nose.

In a refinement, the first inlet port may have a throat width sized to a fan air flow extraction from a fan air stream at an aircraft design point.

In a further refinement, the method may further comprise capturing about half of the maximum amount of fan air flow required to cool a first amount of engine bleed air to be used for air circulation within a cabin of an aircraft and a second amount of engine bleed air to be used for de-icing a portion of the aircraft.

In another refinement, the method may further comprise receiving in the first inlet port the maximum fan air flow extraction from a main fan stream with an above-average total pressure distribution across a fan flow channel span.

In another refinement, the nose may be generally tear-shaped.

These and other aspects and features of the present disclosure will be better understood upon reading the following detailed description when taken in conjunction with the accompanying drawings.

DETAILED DESCRIPTION

Figure 1:
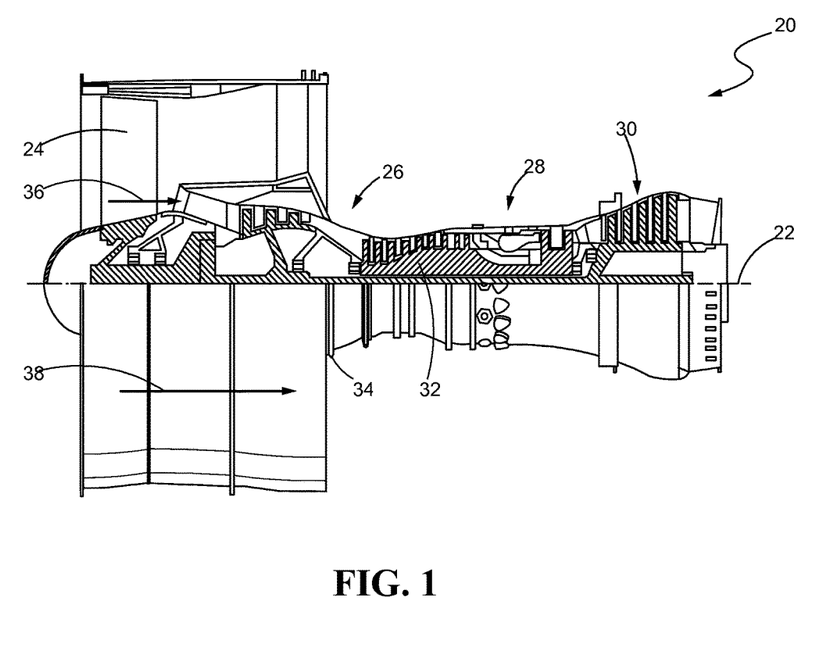
FIG. 1 is a sectional view of a gas turbine engine constructed in accordance with the present disclosure.

Referring now to the drawings, and with specific reference to FIG. 1, a gas turbine engine constructed in accordance with the present disclosure is generally referred to by reference numeral 20. As shown therein, the gas turbine engine 20 may include a fan 24, a compressor section 26, a combustor 28, and a turbine section 30 axially aligned along longitudinal axis 22. Moreover, it can be seen that the fan 24, compressor 26, and turbine 30 are all mounted on the same shaft 32, or in the case of dual-spool engines as shown having primary and secondary compressors and turbines, shafts 32 and 34 which are concentrically mounted. As also shown in FIG. 1, air may enter the engine 20 along airstream arrow 36 as working air and continue into the compressor 24 before being compressed and directed to the combustor 26. In the combustor, the compressed air is combined with fuel and combusted. The resulting hot and expanding combustor gases are then directed to the turbine section 28 before exiting the engine 20 as exhaust. Concurrent with working airstream 36, however, a larger portion of air exits the fan 22 as bypass air along bypass airstream arrow 38. The ratio of bypass air to working air is known as the bypass ratio.

While effective, the present disclosure improves upon the prior art by, among other things, providing a bifurcated inlet scoop or frame 100 as shown best in FIGS. 2-8. As will be described in further detail herein, the inlet scoop 100 allows for a maximum corrected air flow rate required for precooler operation, while incurring less fan stream flow disturbance at high altitude or take-off, and delivering the targeted total pressure at the fan air valve inlet to the precooler.

Figure 5:
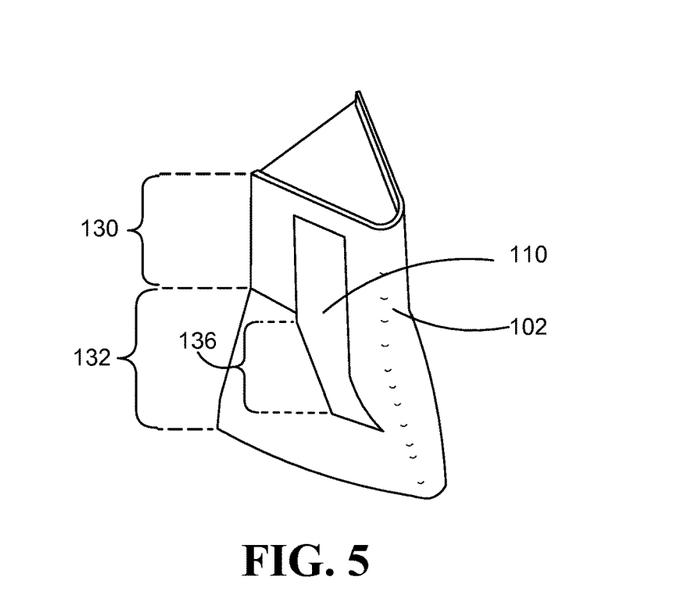
FIG. 5 is another perspective view of the bifurcated inlet scoop frame of FIG. 2.
Figure 6:
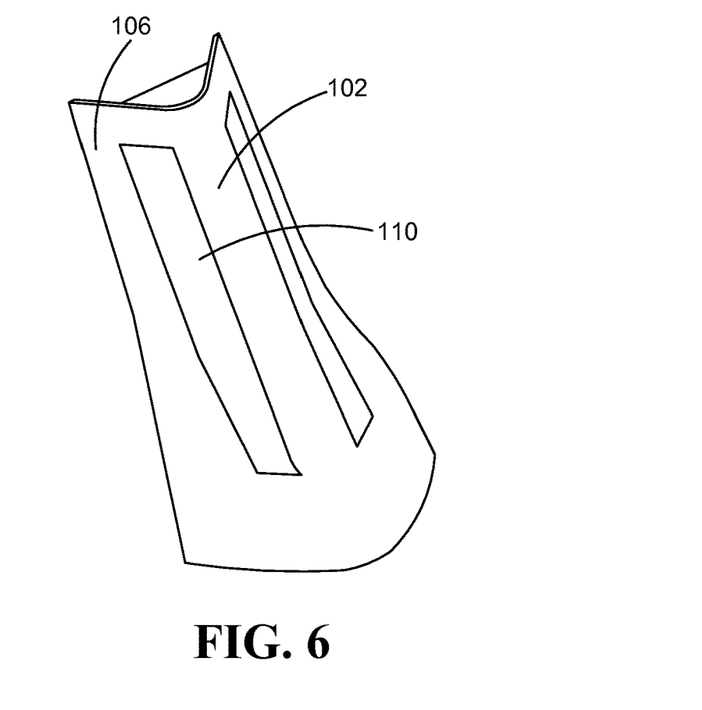
FIG. 6 is another perspective view of the bifurcated inlet scoop frame of FIG. 2.
Figure 7:
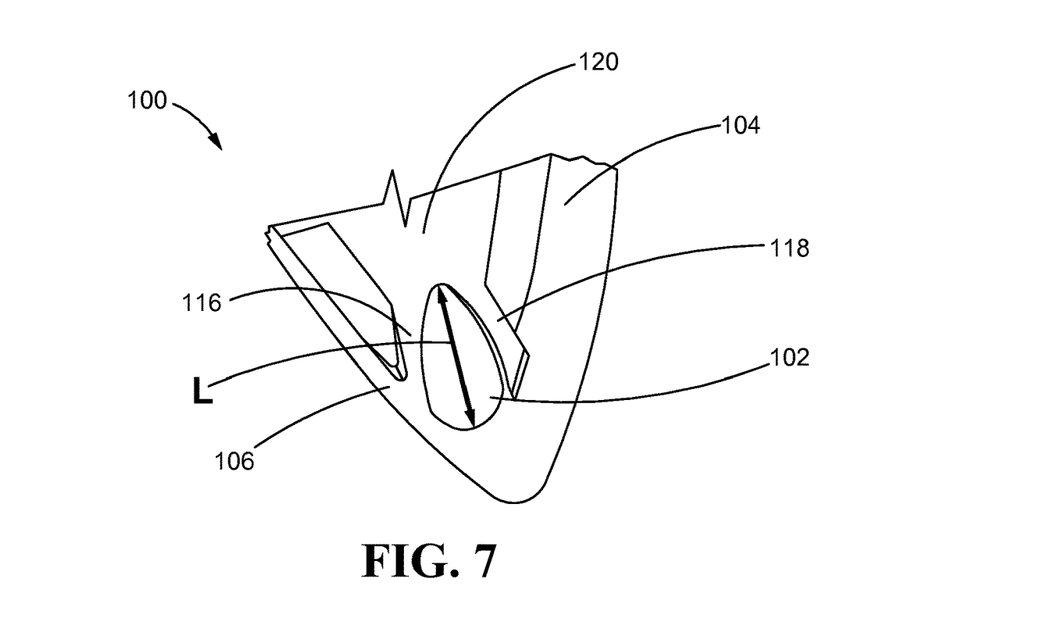
FIG. 7 is a fragmentary view of the bifurcated inlet scoop frame.

As can be best seen in FIGS. 2-6, the bifurcated frame 100 comprises a nose 102, a first side panel 104 and a second side panel 106 (FIGS. 5-6). The nose 102 and the first side panel 104 (FIGS. 2-5) may define a first inlet port 108 disposed at the entrance to a first channel 118 (see FIG. 7). The nose 102 and the second side panel 106 may define a second inlet port 110 (FIGS. 5-6) disposed at the entrance to a second channel 116 (FIG. 7). As best seen in FIG. 7, the first and second channels 116, 118 each extend into an inner cavity 120 disposed within the bifurcated inlet scoop frame 100.

The nose 102 may be an elongated structure. In one embodiment, the nose 102 may be attached to, or mounted on, the first and second side panels 104, 106 (FIGS. 2-6). In another embodiment, the nose 102 may be integral with the first and second side panels 104, 106.

The exterior surface of the nose may have a leading edge 112. In one embodiment, the leading edge 112 may be generally rounded. Other more angular geometries for the leading edge are contemplated as well. In one embodiment, such as that shown in FIGS. 2-8, the nose 102 may include a generally straight nose portion 126 and a sloped nose portion 128. In other embodiments, the leading edge 112 (and nose 102) may extend from the top 122 of the frame 100 to the bottom 124 of the frame 100 in a generally straight manner without the slope seen in FIGS. 2-6.

Figure 2:
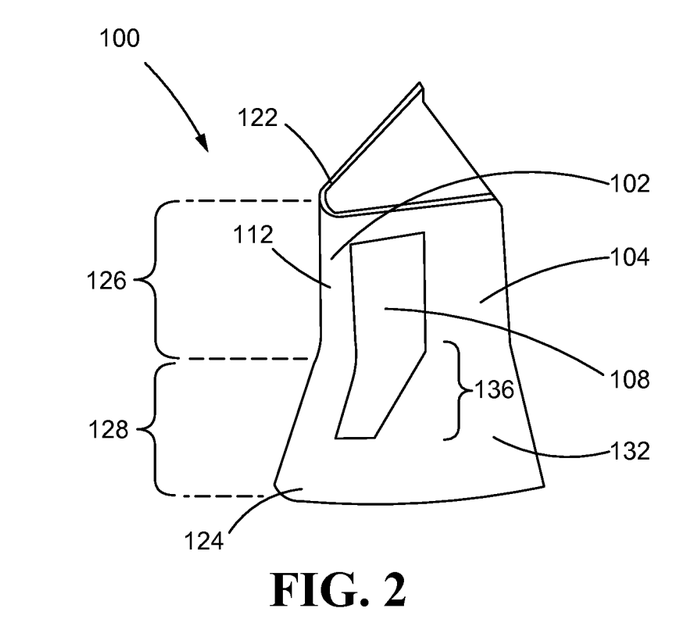
FIG. 2 is a perspective view of an embodiment of a bifurcated inlet scoop frame constructed in accordance with the teachings of this disclosure.
Figure 3:
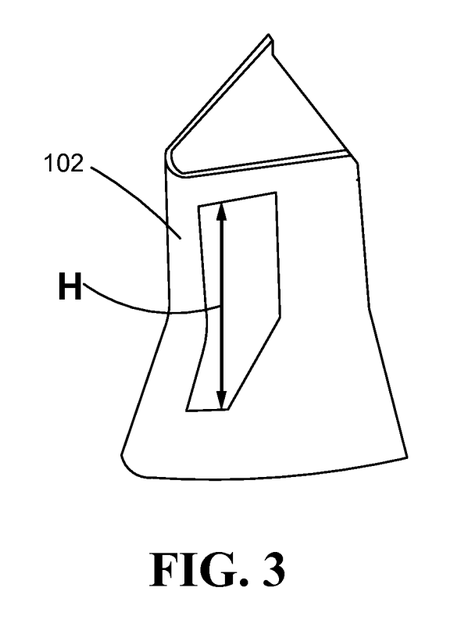
FIG. 3 is another perspective view of the bifurcated inlet scoop frame of FIG. 2.
Figure 4:
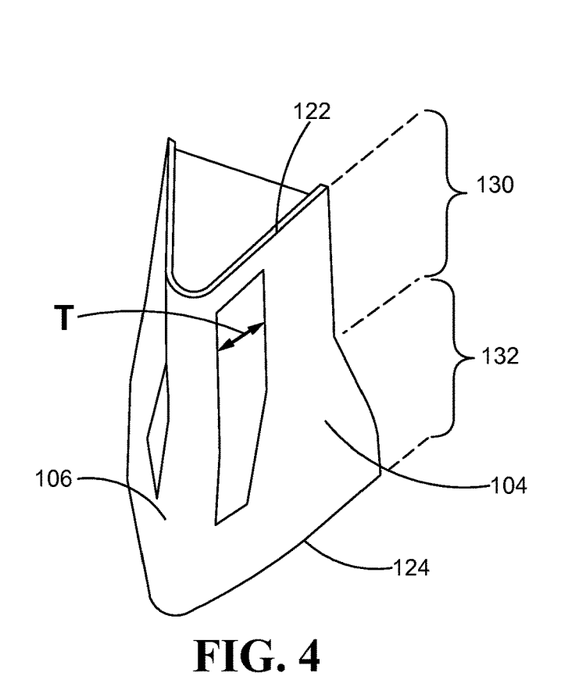
FIG. 4 is another perspective view of the bifurcated inlet scoop frame of FIG. 2.

As can been seen in the cross-sectional view of FIG. 2, the nose 102 may, in some embodiments, be generally teardrop shaped to aerodynamically diffuse the intake air. The teardrop length L may vary depending on the height, H (see FIG. 3) and throat width, T, (see FIG. 3) of each of the first and second inlet ports 108, 110 and the degree of downstream flow diffusion desired in an application. Flow diffusion may generally occur near the intersection of the first and second channels 116, 118 (FIG. 2) and the inner cavity 120.

Similar to the nose 102, each of the first and second side panels 104, 106 (FIG. 4) may extend from the top 122 of the frame 100 to the bottom 124 of the frame. In one embodiment, the first and second side panels 104, 106 may each be oriented at an angle to the nose 102 such that each of the first and second side panels 104, 106 tapers outward from the nose 102. In such an embodiment, the bifurcated inlet scoop frame 100 may be generally wedge shaped in order to aerodynamically increase the flow area toward downstream and to diffuse the air to recover the dynamic head into the pressure. In another embodiment, the first and second side panels 104, 106 may extend radially outward. As shown in the embodiment illustrated in FIGS. 2-6, each of the first and second side panels 104, 106 may include a panel 130 and a sloped skirt 132. The skirt 132 is not limited to a sloped geometry. For example, in an embodiment, the side panels 104, 106 may extend from the top 122 to the bottom 124 of the frame in a generally straight manner.

The shape of the perimeter of the first and second inlet port openings 108, 110 may vary according to the application. For example, the shape of the first and second inlet ports 116, 118 may be generally rectangular, oblong, or may follow the general shape of the side panels 104, 106. As seen in the embodiment illustrated in FIGS. 2 and 5, each of the first and second inlet ports 108, 110 have a generally sloped inlet portion 136 disposed in the (sloped) skirt 132 of the first and second side panels 104, 106.

Figure 9:
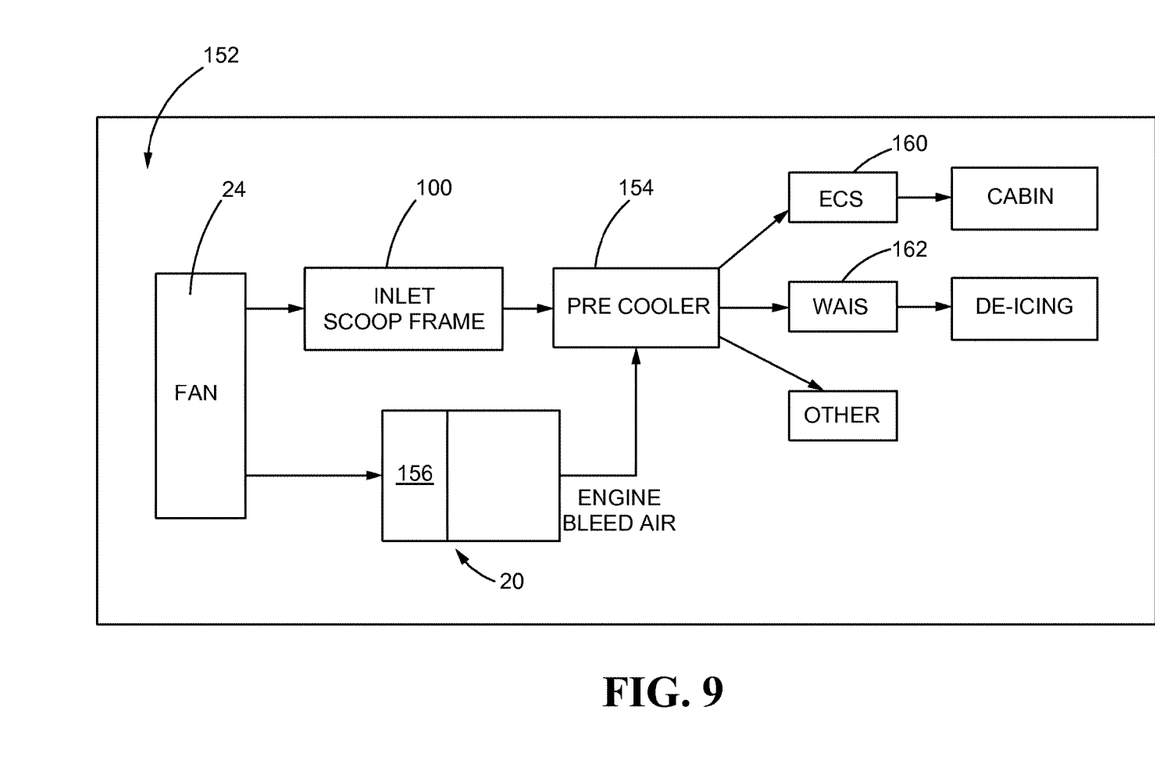
FIG. 9 is a schematic illustrating the flow of the portion of the fan air received by the first and second inlet ports of the bifurcated inlet scoop frame.

The height, H, (FIG. 2) and the throat width, T, (FIG. 4) may vary depending on engine and aircraft parameters. In one embodiment, the height, H, may be sized to substantially capture the maximum fan air flow extraction from the main or bypass fan air stream (generated by the fan 24 (FIG. 9) on a given aircraft 152 upstream from the bifurcated inlet scoop frame 100) with an above-average total pressure distribution across the fan flow channel span. The fan flow channel span is the radial span of the fan stream.

In addition, the throat width, T, (FIG. 4) of each of the first and second inlet ports 108, 110, may be substantially sized to a fan air flow extraction from the fan air flow stream at a given aircraft design point, and to substantially capture about half of the maximum amount of fan air flow rate required downstream of the inlet ports 108, 110 by a precooler 154, or heat exchanger, to cool engine bleed air from the High Pressure Compressor (HPC) 156 of the aircraft engine 20 at the highest ECS 160 and WAIS 162 flow rate demand combination for the precooler.

Figure 8:
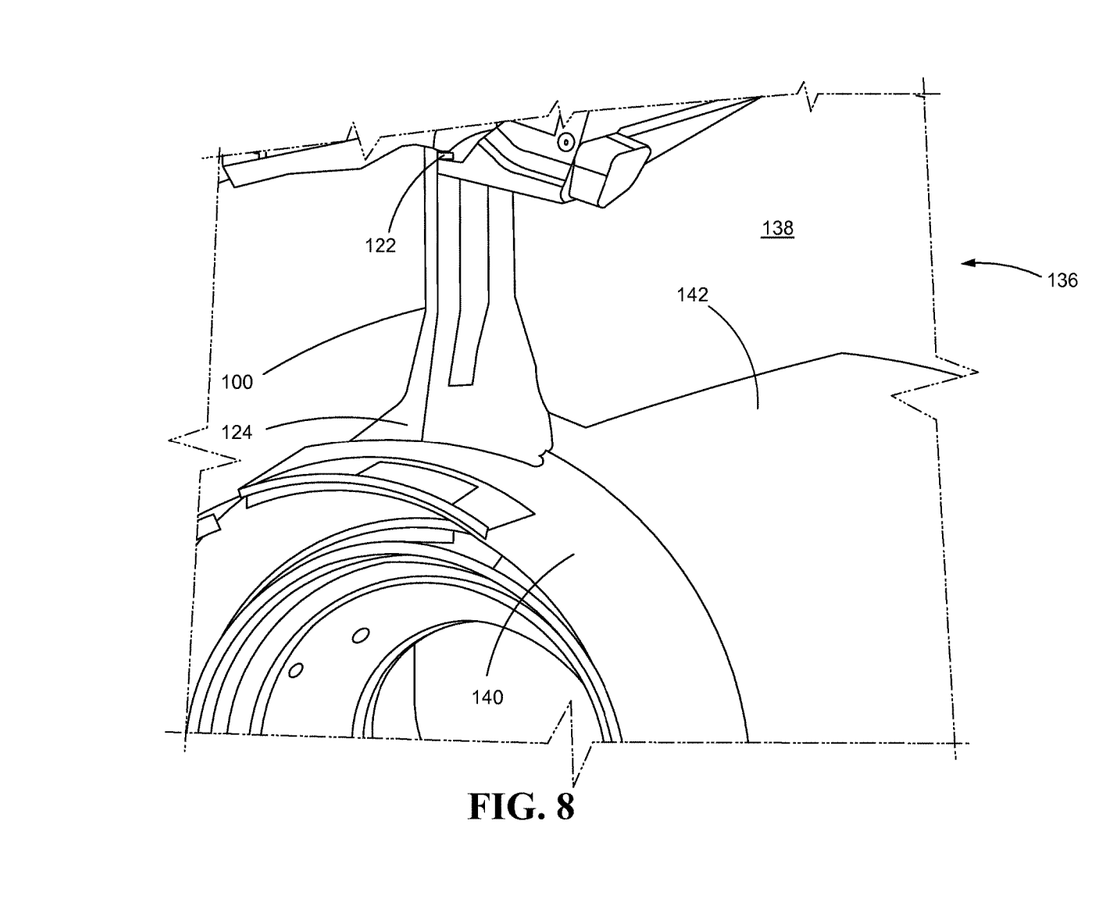
FIG. 8 is a perspective view of a bifurcated inlet scoop frame of FIG. 2 mounted on a portion of an aircraft proximate the gas turbine engine.

As shown in FIG. 8, the bifurcated inlet scoop frame 100 may be mounted, directly or indirectly, to a portion of the gas turbine engine 20, such as the nacelle 142. Alternatively, the bifurcated inlet scoop frame 100 may be attached at the top 122 to the upper pylon 138 or attached to the fan case outer V-groove and attached at the bottom 124 to the fan inner case 140 of a turbofan engine. In other embodiments, the bifurcated inlet scoop frame 100 may be mounted on a low pressure compressor exit frame of the engine 20 with the bottom 124 of the frame 100 entrapped into a groove, such as an inner V-groove on the aft end of the low pressure compressor exit frame. There may be a seal around the inlet scoop frame 100 to seal the interface with adjacent components of the nacelle 142

INDUSTRIAL APPLICABILITY

In general, the present disclosure sets forth a gas turbine engine and bifurcated inlet scoop frame having multiple industrial applications.

For example, the bifurcated scoop allows for increased airflow for precooler operation, cabin air conditioning and de-icing, while not decreasing fan air stream flow at high altitude, take-off or other off-design flight points. More specifically, the leading edge of the nose of the bifurcated inlet scoop frame 100 will splits the incoming fan air flow stream. A portion of the split fan air stream is then captured by the first and second inlet ports disposed in the first and second side panels 104, 106.

The dimensional size and angled orientation of the first and second inlet ports to the split fan air flow stream reduces turbulence that may occur when "scooping" or capturing fan air at off-design points when the intake of fan air is relatively low. Such off-design points may include aircraft take-off, flight idle, climb and cruise at non-icing.

The height of the inlet port opening may be configured to intake the maximum fan flow stream total pressure distribution for a fan air stream generated by the fan (see FIG. 9) on a given aircraft. This beneficially results in components downstream of the inlet ports of the inlet scoop frame (such as the precooler) generally receiving the maximum pressurized fan air to facilitate the design of an optimum heat exchanger.

Moreover, the dimensional size of the inlet ports and the orientation to the fan air stream not only minimizes fan air flow disturbance from flow separation when the intake of fan air into the first and second inlet ports is relatively low, the dimensional size of the inlet ports and the orientation to the fan air stream also minimizes fan air flow disturbance that leads to nacelle fan performance penalty at high altitude cruise conditions when the low or intermediate stage HPC bleed air (from the engine) is utilized for nominal ECS flow to the aircraft cabin without a wing anti-icing flow requirement.

The dimensional size of the inlet ports and the orientation to the fan air stream also minimizes fan air stream flow disturbance that induces fan performance debit when the precooler fan air valve and ECS are temporarily closed during the take-off phase of the aircraft.

What is claimed is:
1. A bifurcated inlet scoop frame for a gas turbine engine, comprising:
    a nose defining a leading edge of the bifurcated inlet scoop frame, the nose being generally tear-shaped and having a surface extending from the leading edge into a cavity of the bifurcated inlet scoop frame;
    a first side panel extending from the leading edge of the bifurcated inlet scoop frame, the first side panel and the nose defining a first inlet port and a first channel extending from the first inlet port into the cavity, wherein the first channel is defined by the surface of the nose and a surface of the first side panel extending from the first inlet port into the cavity; and
    a second side panel extending from the leading edge of the bifurcated inlet scoop frame, the second side panel and the nose defining a second inlet port and a second channel extending from the second inlet port into the cavity, wherein the second channel is defined by the surface of the nose and a surface of the second side panel extending from the second inlet port into the cavity, wherein the first side panel and the second side panel each include a sloped skirt and each of the each of the first inlet port and the second inlet port have a have a sloped inlet portion located in the sloped skirt of the first side panel and the second side panel.

2. The bifurcated inlet scoop frame of claim 1, wherein the first inlet port has a throat width sized to a fan air flow extraction from a fan air stream at an aircraft design point.

3. The bifurcated inlet scoop frame of claim 2, wherein the first inlet port has a throat width sized to capture about half of the maximum amount of fan air flow rate required to cool a first amount of engine bleed air to be used for air circulation within an aircraft and a second amount of engine bleed air to be used for de-icing a portion of the aircraft.

4. The bifurcated inlet scoop frame of claim 1, wherein the first inlet port and the second inlet port each have a height configured to capture a maximum fan air flow extraction from a main fan stream.

5. A bifurcated inlet scoop system for a gas turbine engine, the system comprising:
   a gas turbine engine; and
   a bifurcated inlet scoop frame mounted proximate the gas turbine engine, the bifurcated inlet scoop frame, comprising:
   a nose defining a leading edge of the bifurcated inlet scoop frame, the nose being generally tear-shaped and having a surface extending from the leading edge into a cavity of the bifurcated inlet scoop frame;
   a first side panel extending from the leading edge of the bifurcated inlet scoop frame, the first side panel and the nose defining a first inlet port and a first channel extending from the first inlet port into the cavity, wherein the first channel is defined by the surface of the nose and a surface of the first side panel extending from the first inlet port into the cavity; and
   a second side panel extending from the leading edge of the bifurcated inlet scoop frame, the second side panel and the nose defining a second inlet port and a second channel extending from the second inlet port into the cavity, wherein the second channel is defined by the surface of the nose and a surface of the second side panel extending from the second inlet port into the cavity and wherein the first and second side panels taper outward from the nose, and wherein the first side panel and the second side panel each include a sloped skirt and each of the each of the first inlet port and the second inlet port have a have a sloped inlet portion located in the sloped skirt of the first side panel and the second side panel.

6. The bifurcated inlet scoop frame of claim 5, wherein the first inlet port has a first throat width sized to a fan air flow extraction from a fan air stream of the gas turbine engine.

7. The bifurcated inlet scoop frame of claim 6, wherein the first throat width is also sized to capture about half of the maximum amount of fan air flow rate required to cool a first amount of engine bleed air to be used for air circulation within an aircraft and a second amount of engine bleed air to be used for de-icing a portion of the aircraft.

8. The bifurcated inlet scoop frame of claim 7, wherein the second inlet port has a second throat width sized to the fan air flow extraction from the fan air stream of the gas turbine engine.

9. The bifurcated inlet scoop frame of claim 8, wherein the second throat width is also sized to capture about half of the maximum amount of fan air flow required to cool the first amount of engine bleed air to be used for air circulation within an aircraft and the second amount of engine bleed air to be used for de-icing the portion of the aircraft.

10. The bifurcated inlet scoop frame of claim 5, wherein the first inlet port and the second inlet port each have a height configured to capture the maximum fan air flow extraction from a main fan stream.

11. The bifurcated inlet scoop frame of claim 5, wherein the first inlet port has a sloped inlet portion.

12. A method for bifurcating air received from a fan of a gas turbine engine, the method comprising:
   providing a bifurcated inlet scoop frame proximate the gas turbine engine;
   splitting the fan air flow; and
   receiving the fan air flow through the bifurcated inlet scoop frame, wherein the bifurcated inlet scoop frame includes a nose defining a leading edge of the bifurcated inlet scoop frame, the nose being generally tear-shaped and having a surface extending from the leading edge into a cavity of the bifurcated inlet scoop frame, a first side panel and a second side panel each extending from the leading edge of the bifurcated inlet scoop frame, the first side panel and the nose defining a first inlet port and a first channel extending from the first inlet port into the cavity, wherein the first channel is defined by the surface of the nose and a surface of the first side panel extending from the first inlet port into the cavity and the second side panel and the nose defining a second inlet port and a second channel extending from the second inlet port into the cavity, wherein the second channel is defined by the surface of the nose and a surface of the second side panel extending from the second inlet port into the cavity and wherein the first and second side panels taper outwardly from the nose, and wherein the first side panel and the second side panel each include a sloped skirt and each of the each of the first inlet port and the second inlet port have a have a sloped inlet portion located in the sloped skirt of the first side panel and the second side panel.

13. The method of claim 12, wherein the first inlet port has a throat width sized to a fan air flow extraction from a fan air stream at an aircraft design point.

14. The method of claim 13, further comprising capturing about half of the maximum amount of fan air flow required to cool a first amount of engine bleed air to be used for air circulation within an aircraft and a second amount of engine bleed air to be used for de-icing a portion of the aircraft.

15. The method of claim 12, further comprising receiving in the first inlet port the maximum fan air flow extraction from a main fan stream.

\* \* \* \* \*